US009830508B1

(12) United States Patent
Winder et al.

(10) Patent No.: US 9,830,508 B1
(45) Date of Patent: Nov. 28, 2017

(54) SYSTEMS AND METHODS OF EXTRACTING TEXT FROM A DIGITAL IMAGE

(71) Applicant: Quest Consultants LLC, Rockville, MD (US)

(72) Inventors: Jason H. Winder, Chevy Chase, MD (US); Bhaarat Sharma, Great Falls, VA (US)

(73) Assignee: Quest Consultants LLC, Rockville, MD (US)

( * ) Notice: Subject to any disclaimer, the term of this patent is extended or adjusted under 35 U.S.C. 154(b) by 30 days.

(21) Appl. No.: 15/012,368

(22) Filed: Feb. 1, 2016

Related U.S. Application Data

(60) Provisional application No. 62/109,685, filed on Jan. 30, 2015.

(51) Int. Cl.
*G06K 9/34* (2006.01)
*G06K 9/00* (2006.01)
*G06K 9/40* (2006.01)
*G06K 9/46* (2006.01)

(52) U.S. Cl.
CPC ..... *G06K 9/00463* (2013.01); *G06K 9/00456* (2013.01); *G06K 9/40* (2013.01); *G06K 9/4604* (2013.01); *G06K 9/4661* (2013.01)

(58) Field of Classification Search
CPC .......... G06K 9/00456; G06K 9/00463; G06K 9/00469; G06K 9/00476; G06K 9/036; G06K 9/2054; G06K 9/2063; G06K 9/325; G06K 9/3258; G06K 9/348; G06K 9/40; G06K 9/46; G06K 9/4604; G06K 9/6814; G06K 9/74; G06K 15/107; G06K 2209/01; G06K 9/36; G06K 9/4671; G06K 2009/4666; G06T 11/60; G06T 2207/10004; G06T 2207/30; G06T 7/33; H04N 1/642

See application file for complete search history.

(56) References Cited

U.S. PATENT DOCUMENTS

| 6,233,353 | B1 * | 5/2001 | Danisewicz ....... G06K 9/00456 382/176 |
| 7,505,180 | B2 | 3/2009 | DeYoung et al. |
| 7,953,295 | B2 | 5/2011 | Vincent et al. |
| 8,320,674 | B2 | 11/2012 | Guillou |
| 8,494,280 | B2 * | 7/2013 | Nagarajan ............ G06K 9/2054 345/589 |

(Continued)

*Primary Examiner* — Jose Couso
(74) *Attorney, Agent, or Firm* — Berenato & White, LLC

(57) ABSTRACT

A method of extracting text from a digital image is provided. The method of extracting text includes receiving a digital image at an image processor where the digital image includes a textual object and a graphical object. A mask is generated based on the digital image. The mask includes a pattern having a first pattern area associated with the textual object and a second pattern area associated with the graphical object. The mask is applied to the digital image creating a transformed digital image. The transformed digital image includes a portion of the digital image associated with the textual object. Character recognition is performed on the portion of the digital image associated with the textual object of the transformed digital image to create a recognized text output.

20 Claims, 12 Drawing Sheets

(56) References Cited

U.S. PATENT DOCUMENTS

| | | | | |
|---|---|---|---|---|
| 8,548,241 B2* | 10/2013 | Zyuzin | ............... | G06K 9/00456 |
| | | | | 382/173 |
| 8,634,644 B2* | 1/2014 | Chiu | ................. | G06K 9/00456 |
| | | | | 382/164 |
| 8,744,173 B2* | 6/2014 | Vincent | ................ | G06K 9/3258 |
| | | | | 382/101 |
| 8,849,031 B2* | 9/2014 | Handley | ............ | G06K 9/00456 |
| | | | | 382/164 |
| 8,903,136 B1 | 12/2014 | Wang et al. | | |
| 8,917,935 B2* | 12/2014 | Epshtein | ............ | G06K 9/00463 |
| | | | | 358/462 |
| 9,098,888 B1* | 8/2015 | Lin | .......................... | G06K 9/18 |
| 9,235,757 B1* | 1/2016 | Liu | ........................ | G06K 9/325 |
| 9,349,062 B2* | 5/2016 | Mei | .......................... | G06K 9/18 |
| 9,405,985 B1* | 8/2016 | Burry | ................... | G06K 9/3258 |
| 9,430,704 B2* | 8/2016 | Abdollahian | ........ | G06K 9/3283 |
| 9,508,170 B2* | 11/2016 | Kashibuchi | ............. | G06T 11/60 |
| 9,569,679 B1* | 2/2017 | Gray | ........................ | G06K 9/18 |
| 9,576,348 B2* | 2/2017 | Angara | ................... | G06T 5/006 |
| 2005/0180645 A1* | 8/2005 | Hasegawa | .......... | G06K 9/00456 |
| | | | | 382/239 |
| 2007/0041642 A1 | 2/2007 | Romanoff et al. | | |
| 2009/0148043 A1* | 6/2009 | Ophir | ................. | G06K 9/00456 |
| | | | | 382/176 |
| 2010/0054585 A1 | 3/2010 | Guillou et al. | | |
| 2012/0213429 A1* | 8/2012 | Vasudevan | ......... | G06K 9/00476 |
| | | | | 382/162 |
| 2014/0168478 A1 | 6/2014 | Baheti et al. | | |
| 2015/0379300 A1* | 12/2015 | Terada | ............... | G06K 9/00469 |
| | | | | 726/28 |

\* cited by examiner

SYSTEMS AND METHODS OF EXTRACTING TEXT FROM A DIGITAL IMAGE

CROSS-REFERENCE TO RELATED APPLICATION(S) AND CLAIM(S) OF PRIORITY

This application claims the benefit of priority of U.S. Provisional Application No. 62/109,685 filed Jan. 30, 2015, the complete disclosure of which is incorporated herein by reference.

FIELD OF THE INVENTION

The present invention is directed to systems and methods of image processing and more particularly, to improved systems and methods of extracting text from a digital image including a graphical object.

BACKGROUND

Digital images can include various types of content such as landscapes, people, buildings, and other objects. Digital images can be originally captured using various input devices such as cameras, video recorders, etc. Textual object (i.e., alphanumeric characters, symbols, etc.) are often included in a digital image where the textual object can be a part of the original content of the digital image or the textual object can be introduced and provided over the content after the digital image is captured.

Textual objects can include text of varying size, orientation, and/or typeface. Textual objects in a digital image can include information associated with graphical objects in the digital image. For example, when the textual object is a part of the original content of the digital image, the textual object can include street signs, building names, address numbers, etc. When the textual object is introduced after the digital image is captured, the textual object can be identifiers or descriptions associated with the graphical objects included in the digital image or any other textual content.

Character recognition techniques, such as optical character recognition (OCR), have been used to extract text from digital documents to generate searchable text. However, conventional OCR techniques are based on the digital document being a text document having a high resolution (e.g., over 300 dots per inch (dpi)) where the background has uniform contrast. In contrast, digital images generally have non-uniform contrast caused by various factors including image quality, noise, uneven lighting, compression, distortion, number and/or type of graphical objects within the image, etc. In addition, digital images can have a lower resolution (e.g., 50 dpi or lower) than a digital document.

Various imaging processing techniques have been attempted to extract text from a digital image including graphical objects such as edge based methods, texture based methods, and region based text localization methods. However, these techniques can use significant processing resources and can generate inaccurate text strings that require significant user review.

Digital images can also include sensitive information such as proprietary or confidential information. For example, digital images can include sensitive customer data including credit card numbers, social security numbers, account numbers, etc. Techniques to prevent sensitive information from being publicly accessed or disseminated often do not adequately protect and/or classify sensitive textual information within digital images having textual and graphical objects.

Therefore, a need exists for an improved system and method of image processing that extracts text from a digital image including a graphical object. Moreover, a need exists for an improved system and method of data loss prevention that includes a workflow approval process based on text extracted from a digital image including a graphical object.

SUMMARY OF THE INVENTION

An aspect of the invention provides a method of extracting text from a digital image. The method of extracting text includes receiving a digital image at an image processor where the digital image includes a textual object and a graphical object. A mask is generated based on the digital image. The mask includes a pattern having a first pattern area associated with the textual object and a second pattern area associated with the graphical object. The mask is applied to the digital image creating a transformed digital image. The transformed digital image includes a portion of the digital image associated with the textual object. Character recognition is performed on the portion of the digital image associated with the textual object of the transformed digital image to create a recognized text output.

Other aspects of the invention, including apparatus, articles, methods, systems, assemblies, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description, serve to explain the principles of the invention. In such drawings.

DETAILED DESCRIPTION

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

Figure 1:
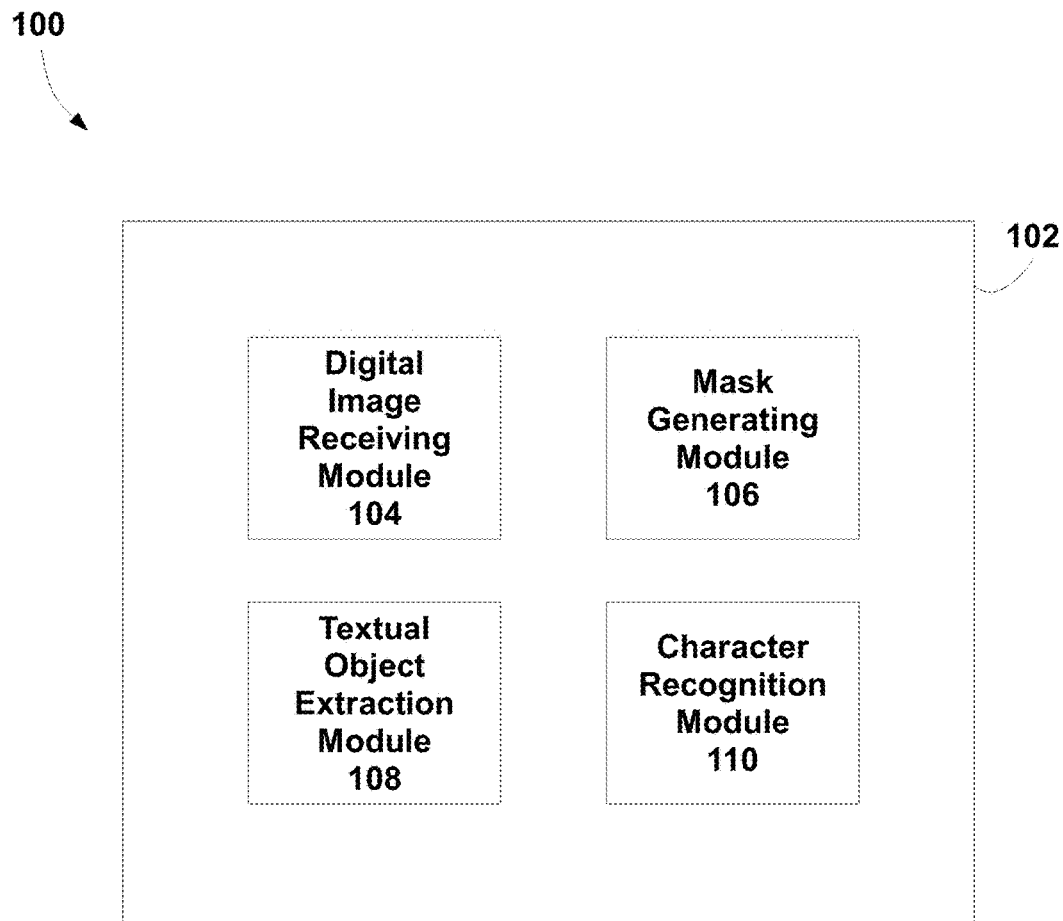
FIG. 1 is an image processing system according to an exemplary embodiment of the present disclosure.

FIG. 1 illustrates an image processing system 100 including an image processing node 102. The image processing node 102 includes a digital image receiving module 104, a mask generating module 106, a text object extraction module 108, and a character recognition module 110. While omitted for clarity and ease of illustration, the imaging processing system 100 can include various other elements such as a digital image capturing device, storage modules, etc. In addition, the image processing node 102 can be a single device or at least one of the digital image receiving module 104, mask generating module 106, text object extraction module 108, and character recognition module 110 can be a separate and/or standalone element.

Image processing node 102 is configured to perform signal processing such as digital signal processing on a digital image to generate a resulting digital image and/or extract information, characteristics, or parameters relating to the digital image. A digital image is acquired using any known imaging device such as a digital camera, a video camera, a satellite imagery system, a scanner, etc. The imaging device can be in communication with the image processing node 102 by any known manner such as coupled local to the image processing node 102, connected over a network, etc.

The digital image can be a still image, a frame, a scanned image, an image created using computer graphics, or a combination thereof. In an exemplary embodiment, the digital image can be a non-searchable text document created in various ways including scanning original document or converting a text searchable document into a non-searchable text document format. The digital image can be in any imaging format such as JPEG, JFIF, Exif, TIFF, RIF, GIF, BMP, PNG, PPM, PGM, PBM, PNM, WEBP, HDR, BPG, CGM, SVG, etc. The digital image includes at least one textual object and/or graphical object. However, the digital image can include any number of textual and/or graphical objects.

A textual object is a glyph of any size, orientation, and/or typeface. A glyph can include alphabetic letters, typographic ligatures, characters, numerical digits, punctuation marks, or any other symbol. The glyph can be associated with any writing system or language such as Greek, Roman, English, Arabic, Japanese, Chinese, etc. The textual object can be a part of the original content of the digital image such as a street sign, building name, address numbers, etc. In addition or alternatively, the textual object can be introduced after the digital image is captured. For instance, the digital image can be annotated to include a textual object. In an exemplary embodiment, when the textual object is introduced after the digital image is captured, the textual object may provide information associated with at least one graphical object included in the digital image such as an identifier or description. The textual object can be a single glyph, two or more adjacent glyph, and/or two or more adjacent groups of glyphs.

A graphical object is any two-dimensional depiction of a physical object captured by the imaging device. In an exemplary embodiment, the two-dimensional depiction can represent a tree, a building, a road, an automobile, a person, or any other physical object. In an exemplary embodiment, when the image is acquired using a satellite imagery system, the two-dimensional depiction can also include a map or other graphic representation of a geographic area such as topography, etc. The graphical object can further include any environmental condition such as rain, snow, etc. or any influence on light conditions created by other physical objects such as a shadow, etc. It is noted that the graphical object can include a textual object. For instance, when a street sign is captured by an image capturing device, the size, shape, and contour of the sign itself is captured as well as the textual information printed on the sign such as "100 Main Street".

In operation, the digital image receiving module 104 of the image processing node 102 is configured to receive a digital image including at least one textural object and at least one graphical object. The mask generating module 106 is configured to generate a mask based on the digital image received at the digital image receiving module 104. The text object extraction module 108 is configured to apply the mask generated at the mask generating module 106 to the digital image thereby creating a transformed digital image. The character recognition module 110 is configured to perform character recognition on the transformed digital image generated at the text object extraction module 108 to create a recognized text output associated with the textural object.

Figure 2:
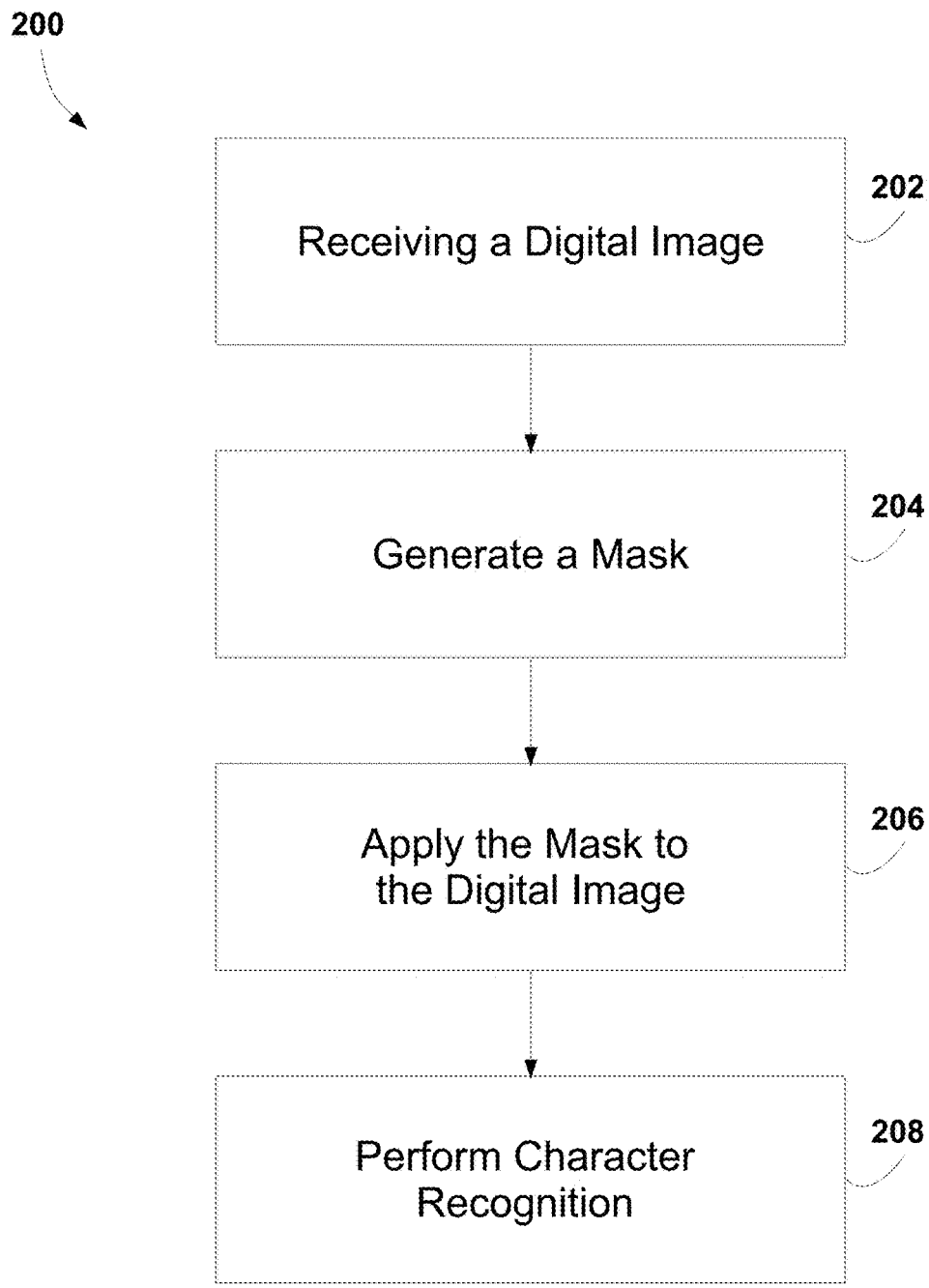
FIG. 2 is a flowchart of a method of processing an image according to an exemplary embodiment of the present disclosure.

FIG. 2 illustrates a flow chart of an exemplary method 200 for extracting text from a digital image. The method will be discussed with reference to the exemplary image processing system 100 illustrated in FIG. 1. However, the method can be implemented with any suitable image processing system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a digital image is received at the image processing system 100. For example, the digital image receiving module 104 of the image processing node 102 receives a digital image. The digital image is acquired using any known imaging device such as a digital camera, a video camera, a satellite imaging system, a scanner, etc. The imaging device can be directly connected to the digital imaging receiving module 104 or the imaging device can capture the image remotely and transmit the digital image over a network to a network node comprising the digital image receiving module 104. The digital image can be in any format and have any resolution. In addition, the digital image can include color and/or grayscale pixels. In an exemplary embodiment, when the digital image includes color pixels, the mask generating module 106 can first transform the digital image into a grayscale image prior to generating the mask using any known or suitable conversion technique.

Figure 4:
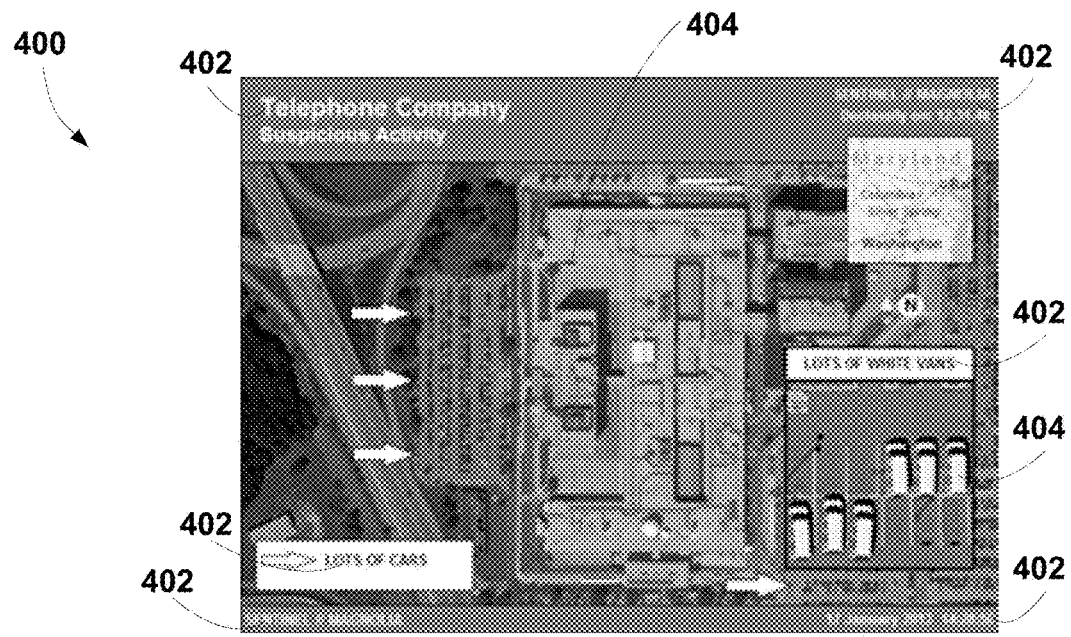
FIG. 4 shows an image that includes textual objects and graphical objects according to an exemplary embodiment of the present disclosure.

In an exemplary embodiment, as best illustrated in FIG. 4, an exemplary digital image 400 includes textual objects 402 and graphical objects 404. Textual objects 402 illustrated in FIG. 4 include various identifiers, descriptors, date, time, etc. Graphical objects 404 illustrated in FIG. 4 include depictions of buildings, parking lots, vans, a portion of a map, etc. While FIG. 4 is taken from an aerial view, one of ordinary skill in the art would recognize that the digital image can be captured from any view or angle including street view, panoramic, etc.

Figure 2A:
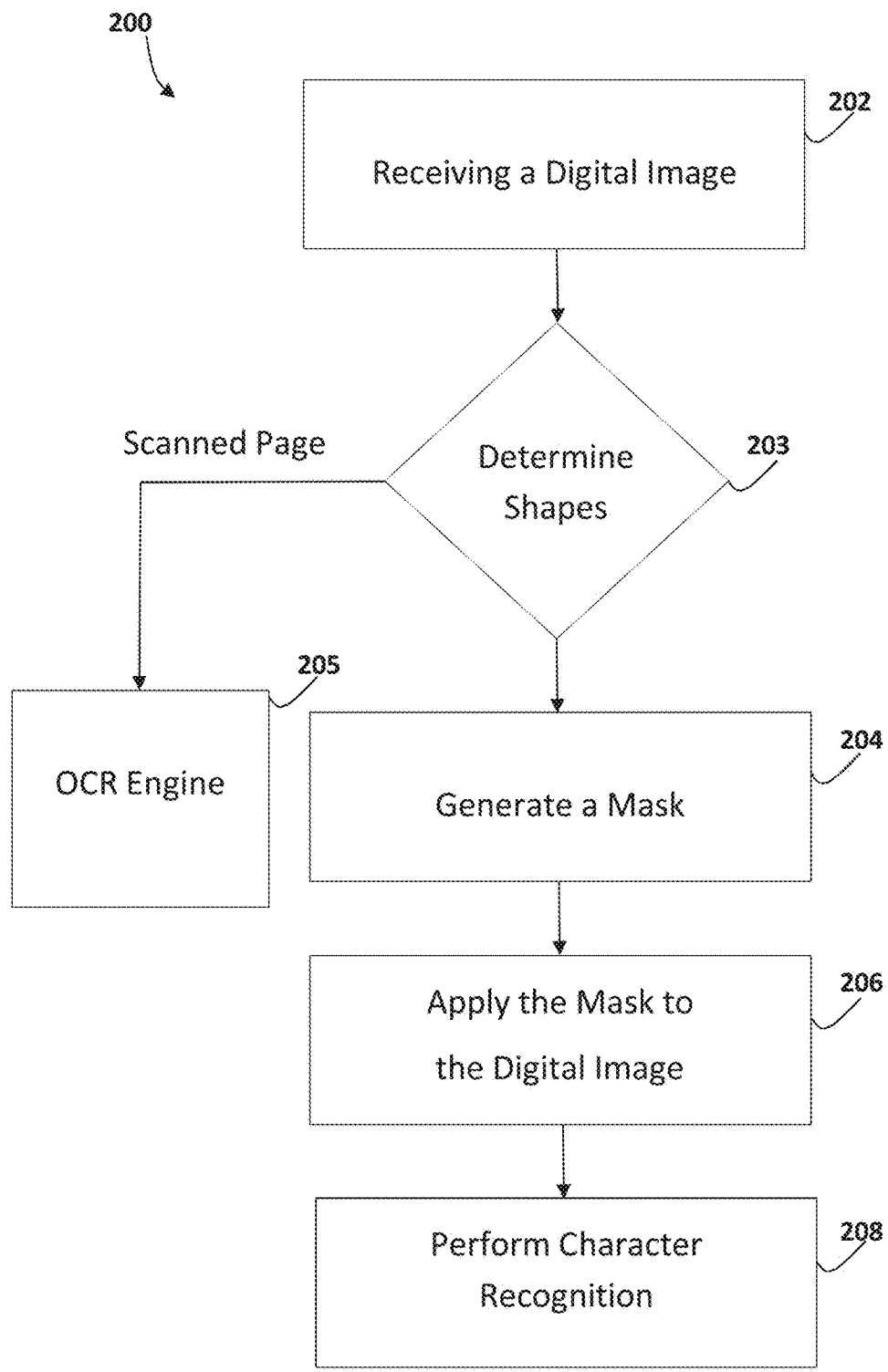
FIG. 2A is a flowchart of a method of processing an image according to a modified exemplary embodiment of the present disclosure.

In a modified embodiment illustrated in FIG. 2A, determination will be made at decision box 203 whether the image received is an unsearchable scanned document or an unsearchable digital image. If the digital image received at 202 has text in horizontal lines throughout the image, then it is regarded as an unsearchable scanned document and sent to an open source Tesserat OCR engine 205. Alternatively, if the digital image received at 202 does not have text in horizontal lines throughout the image, a mask is generated at 204 and subsequent pre-processing steps are followed.

At 204, a mask is generated based on the digital image received at the image processing system 100. For example, mask generating module 106 of the image processing node 102 is configured to receive the digital image after it has been transformed into grayscale values. Alternatively, if the original digital image is in grayscale values, no further transformation is necessary before transmitting the digital image to the mask generating module 106. It is noted that the grayscale values can include any number of different intensity values. For example, pixel intensity values can be selected from 16 different intensity values, 256 different intensity values, 65,536 different intensity values, etc. All available intensity values can be used or a predetermined number of intensity values less than the maximum number of different intensity values can be used.

Figure 3:
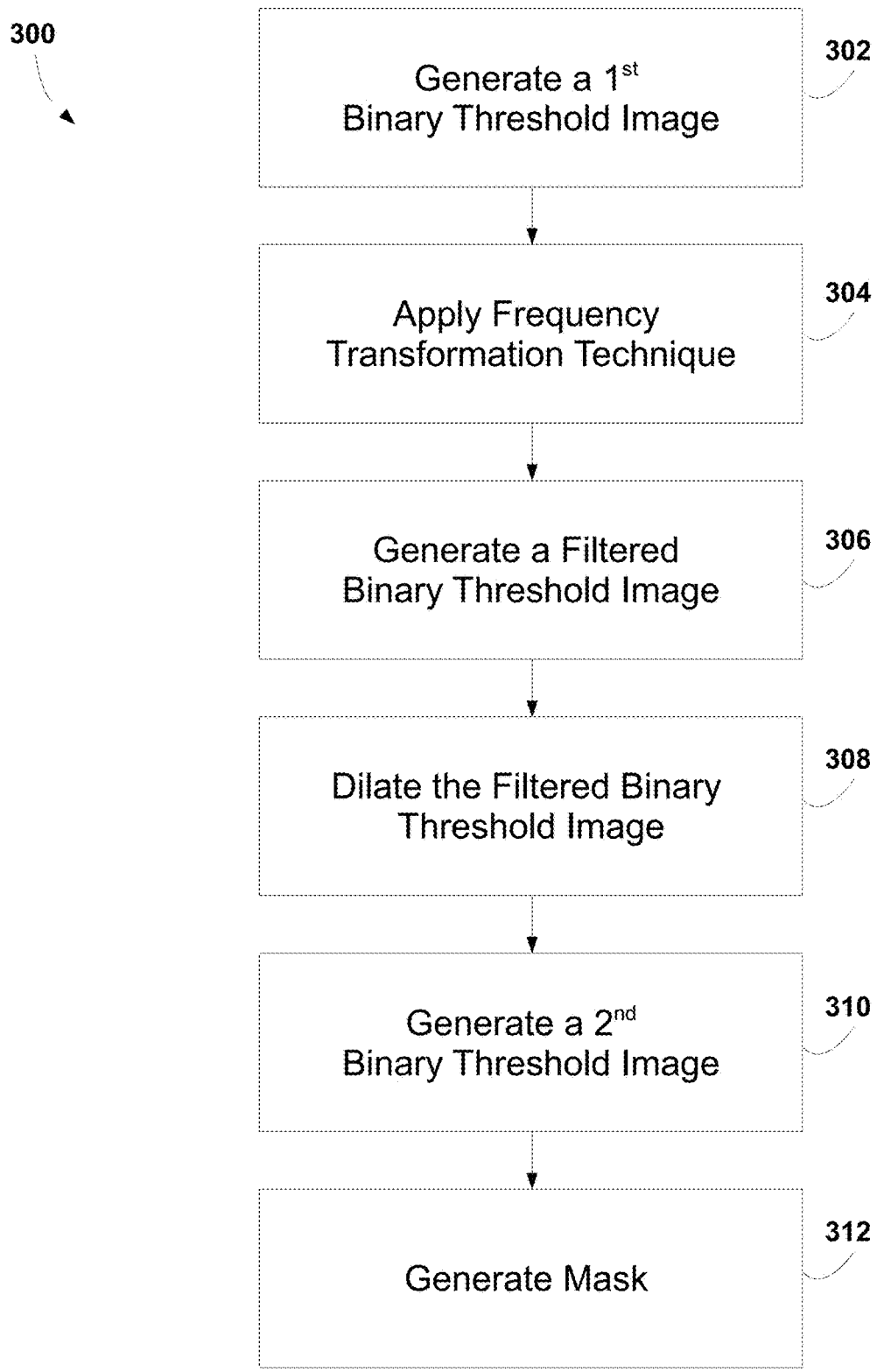
FIG. 3 is a flowchart of a method of generating a mask for processing an image according to an exemplary embodiment of the present disclosure.

FIG. 3 illustrates a flow chart of an exemplary method 300 for generating a mask based on the digital image. The method can be implemented with any suitable image processing system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 302, a first binary threshold image is generated. For example, the mask generating module 106 is configured to generate the first binary threshold image by differentiating pixels based on each pixel's intensity value with respect to a threshold pixel value range. The resulting binary threshold image allows the mask generating module 106 to separate regions of the digital image corresponding to a textual object and a graphical object.

Figure 5:
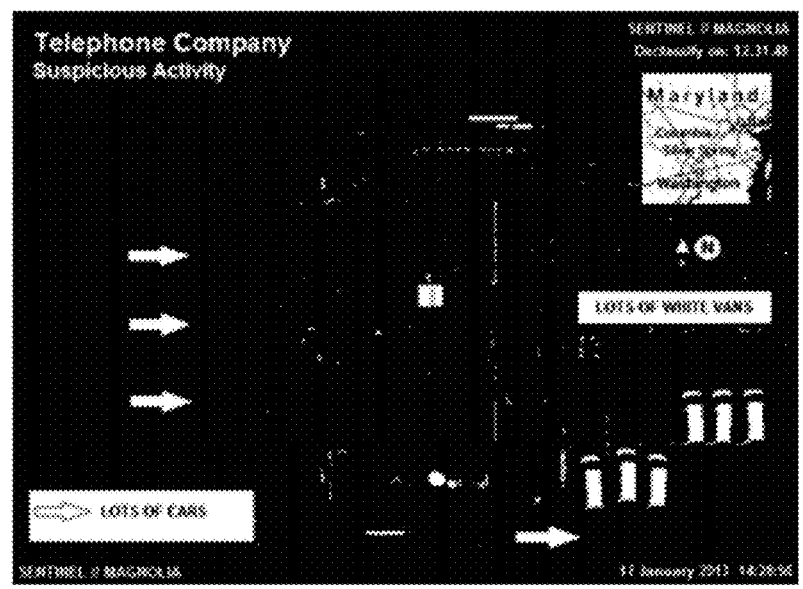
FIG. 5 shows a first binary threshold image generated based on the method of generating a mask for processing an image according to an exemplary embodiment of the present disclosure.

In an exemplary embodiment, the threshold pixel value range is provided at the mask generating module 106. The threshold pixel value range can be predetermined or based on the grayscale digital image. Each pixel value is compared to the threshold pixel value range and when the pixel value is within the threshold pixel value range, the pixel is assigned a first pixel intensity value and when the pixel value is outside of the threshold pixel value range, the pixel is assigned a second pixel intensity value different from the first intensity value. The first pixel intensity value can be selected to be the minimum pixel intensity value (e.g., white) and the second pixel intensity value can be selected to be the maximum pixel intensity value (e.g., black). For example, as illustrated in FIG. 5, the first pixel intensity value can be selected to be a pixel intensity that results in a white pixel and the second pixel intensity value can be selected such that the resulting pixel intensity assigned has a value equal to black intensity level. However, one of ordinary skill in the art would recognize that the first pixel intensity value and the second pixel intensity value can be selected to be any grayscale value provided that the first pixel intensity value is less than the second pixel intensity value and the selected intensity values create sufficient contrast.

For instance, the first binary threshold image can be generated using the following formula:

$$dst(x,y) = \text{maxVal if } scr(x,y) > \text{threshold and 0 otherwise;}$$

where scr (x,y) is the intensity value of the pixel from the digital image, dst (x,y) is the resulting pixel intensity for the binary threshold image, and maxVal is the maximum pixel intensity value.

At 304, a frequency transformation technique is applied to the first binary threshold image. For example, the mask generating module 106 is configured to transform the first binary threshold image to identify regions of the first binary threshold image that include a high concentration of changes in pixel intensity. The higher the frequency of changes in pixel intensity within a predetermined region, the higher the potential that the region of the digital image includes a textual object. When variations in pixel intensity values are within a predetermined range of frequency, the region of the first binary threshold image is identified as potentially including a textual object.

Generally, in a digital image, changes in pixel intensities for a graphical object are gradual where several adjacent pixels within the same row and/or column include the same pixel intensity level. In contrast, changes in pixel intensities for a textual object alternate frequently within a row and/or column. Therefore, typically, for graphical objects, there is a low frequency of changes in pixel intensity and there is a higher frequency of changes in pixel intensities in regions of the digital image associated with textual objects. For textual objects, the changes in pixel intensities are frequent due to the nature of a glyph. For instance, the width of a letter can be represented by two adjacent pixels such that after the binary threshold image is transformed, the change in pixel intensity within a row occurs for each width of a letter and the space between each letter is identified. Likewise, in a column, the change in pixel intensity correlates to the height of a glyph and typically alternates with a higher frequency than a graphical object.

Figure 6:
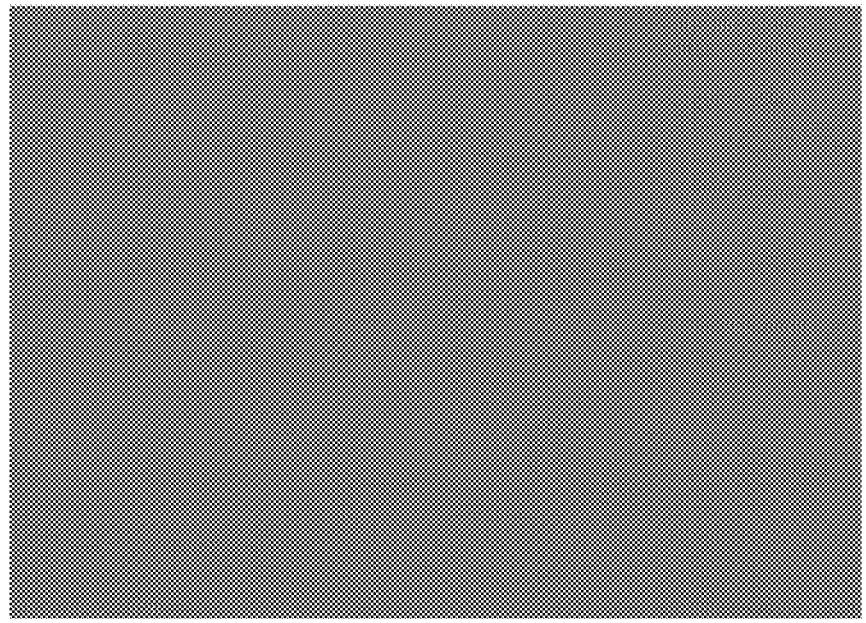
FIG. 6 shows a frequency transformation technique applied to the first binary threshold image based on the method of generating a mask for processing an image according to an exemplary embodiment of the present disclosure.

In an exemplary embodiment, the frequency transformation technique is a discrete cosine transformation where the discrete cosine transform is applied to the first binary threshold image to determine regions that include a pixel variation within the predetermined range, as illustrated in FIG. 6.

At 306, a filtered binary threshold image is generated by isolating portions of the first binary threshold image and removing the noise from the isolated portions of the first binary threshold image. For example, the mask generating module 106 is configured to isolate portions of the first binary threshold image based on the regions identified by the frequency transformation technique where the isolated portions correlate to the regions of the first binary image having a high frequency of changes in pixel intensity. The mask generating module 106 then removes noise from the isolated portions by performing a noise reduction technique thereby creating a filtered binary threshold image.

Figure 7:
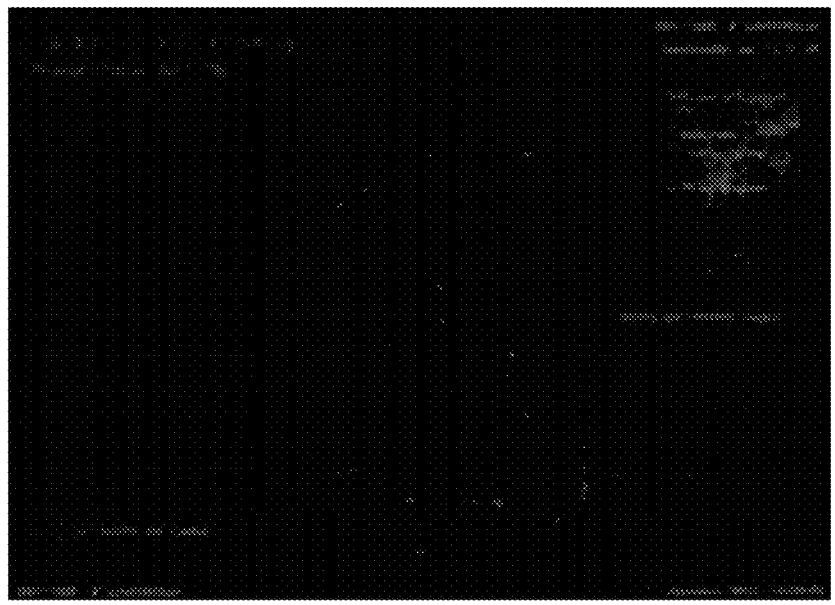
FIG. 7 shows a filtered binary threshold image generated based on the method of generating a mask for processing an image according to an exemplary embodiment of the present disclosure.

Various noise reduction techniques can be implemented. In one noise reduction technique, a noise reduction observation element is defined. The noise reduction observation element can have any shape and/or shape. For example, the size and shape of the noise reduction observation element corresponds to two or more pixels within the first binary threshold image. The noise reduction observation element is applied and systematically compared to each isolated portion of the first binary threshold image. When the graphical object or the textual object within the isolated portions of the first binary threshold image are smaller than the noise reduction observation element and the changes in pixel intensity are less than a predetermined range, the mask generating module 106 generates a filtered binary threshold image where the pixels that correspond to the noise reduction observation element having the first pixel intensity value are converted to the second pixel intensity value to reduce noise in the image as best illustrated in FIG. 7. In an exemplary embodiment, the noise reduction technique is a black top-hat transform where the noise reduction observation element is a structuring element.

Figure 8:
FIG. 8 shows a dilated binary threshold image generated based on the method of generating a mask for processing an image according to an exemplary embodiment of the present disclosure.

At 308, the filtered binary threshold image is dilated. For example, the mask generating module 106 is configured to dilate the filtered binary threshold image in order to increase the regions of the filtered binary threshold image associated with pixels having a first pixel intensity (e.g., the pixels potentially associated with a textual object). A kernel is used to dilate the image where the filtered binary threshold image is transformed to generate a dilated filtered binary threshold image, as best illustrated in FIG. 8. Filtering the binary threshold image re-introduces pixels of varying pixel intensity levels. The pixels of varying intensity levels correspond to the portions of the first binary threshold image isolated in 306.

In an exemplary embodiment, the following kernel can be implemented:

disk5=[[0, 0, 0, 0, 0, 1, 0, 0, 0, 0, 0],
[0, 0, 1, 1, 1, 1, 1, 1, 1, 0, 0],
[0, 1, 1, 1, 1, 1, 1, 1, 1, 1, 0],
[0, 1, 1, 1, 1, 1, 1, 1, 1, 1, 0],
[0, 1, 1, 1, 1, 1, 1, 1, 1, 1, 0],
[1, 1, 1, 1, 1, 1, 1, 1, 1, 1, 1],
[0, 1, 1, 1, 1, 1, 1, 1, 1, 1, 0],
[0, 1, 1, 1, 1, 1, 1, 1, 1, 1, 0],
[0, 1, 1, 1, 1, 1, 1, 1, 1, 1, 0],
[0, 0, 1, 1, 1, 1, 1, 1, 1, 0, 0],
[0, 0, 0, 0, 0, 1, 0, 0, 0, 0, 0]]

Figure 9:
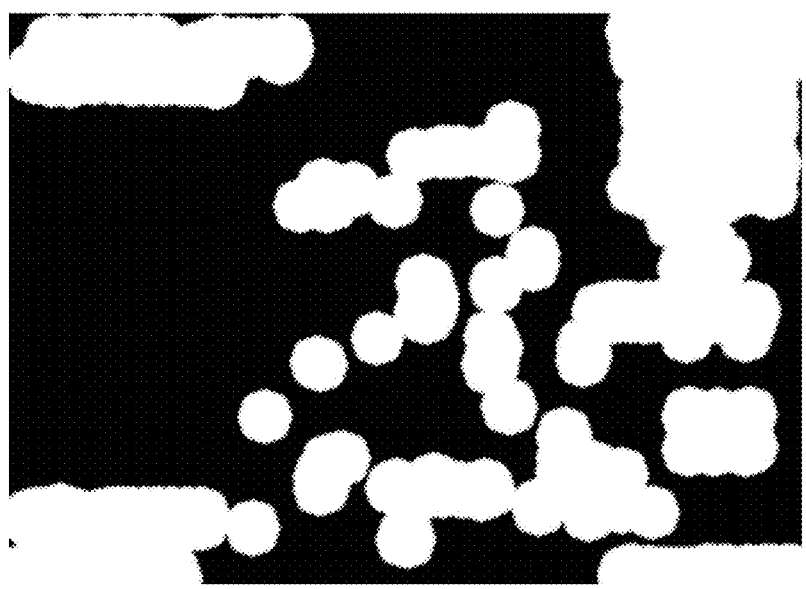
FIG. 9 shows a second binary threshold image generated based on the method of generating a mask for processing an image according to an exemplary embodiment of the present disclosure.

At 310, a second binary threshold image is generated. For example, the mask generating module 106 reduces the varying pixel intensity levels introduced by dilating the filtered binary threshold image using a cluster based thresholding technique. Rather than generating a binary image based solely on pixel intensity values, the second binary threshold image is generated by classifying each pixel as a foreground pixel or a background pixel and defining a threshold range for each class of pixel defined. In an exemplary embodiment, the second binary threshold image is generated using Otsu's method. As best illustrated in FIG. 9, by using Otsu's method to generate the second binary threshold image, portions of the second binary threshold image associated with a textual object are represented by pixels having a pixel intensity value equal to white and portions associated with background or noise are represented by pixels having a pixel intensity value equal to black. It is noted that portions of the first binary threshold image associated with arrows illustrated in FIG. 4 are classified as background pixels thereby reducing the portions of the digital image potentially associated with textual objects.

Figure 10:
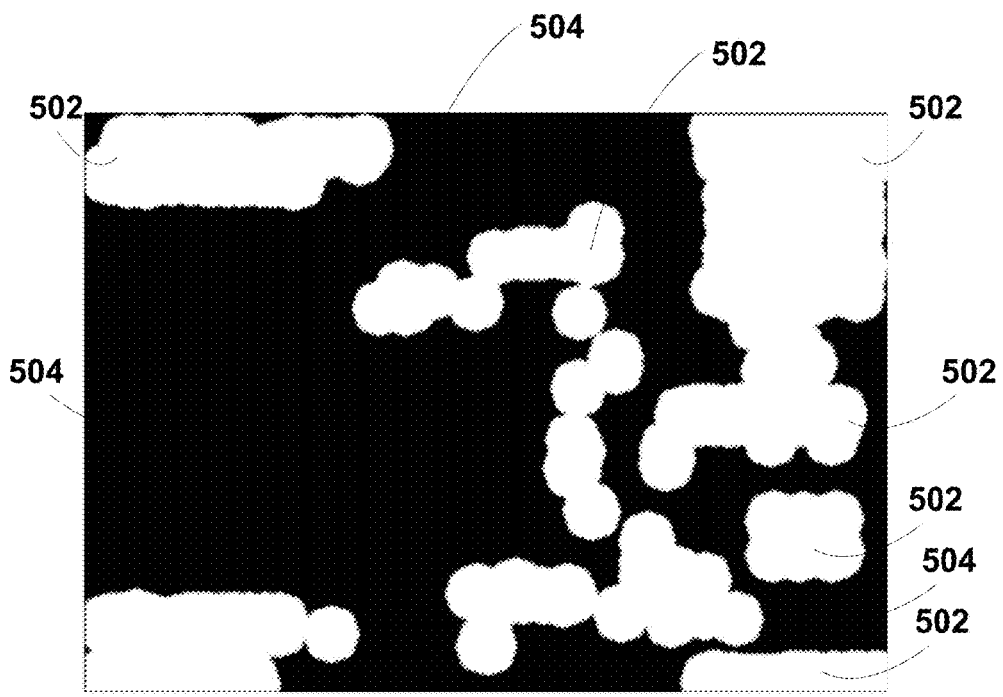
FIG. 10 shows a mask generated based on the method of generating a mask for processing an image according to an exemplary embodiment of the present disclosure.

At 312, a mask is generated including a first pattern area associated with a textual object and a second pattern area associated with a graphical object. For example, the mask generating module 106 removes noise from the second binary threshold image by finding contours within the second binary threshold. In an exemplary embodiment, a predetermined line threshold is defined where the predetermined line threshold corresponds to a potential line of text and two end points of a line are identified. The mask generating module 106 creates a mask, as best illustrated in FIG. 10, having a first pattern area 502 associated with a textual object when the distance between the two points of the line are equal to or greater than the predetermined line threshold and a second pattern area 504 associated with a graphical object when the distance between the two points of the line are less than the predetermined line threshold.

Figure 11:
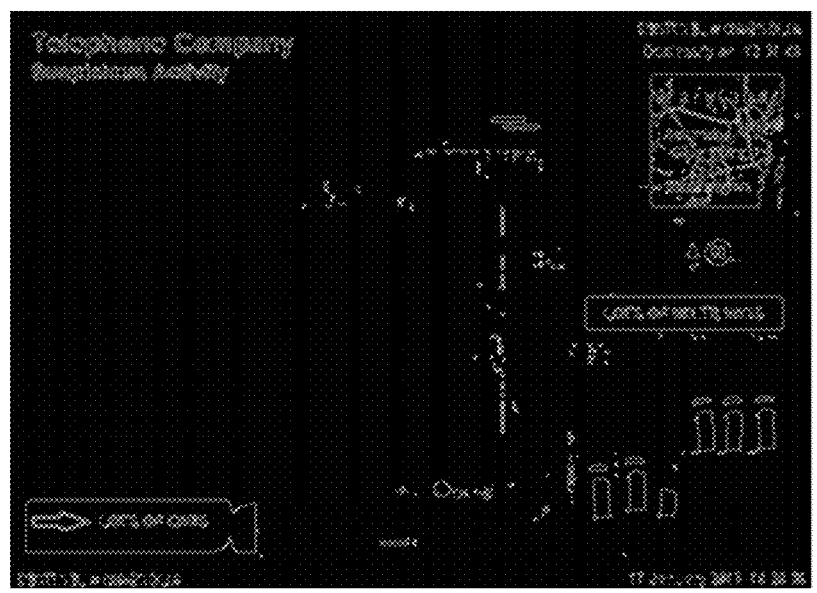
FIG. 11 shows a first filtered image generated based on the method of processing an image according to an exemplary embodiment of the present disclosure.

Referring back to FIG. 2, after the mask is generated at 204, the mask is applied to the digital image at 206. For example, the textual object extraction module 108 applies the mask generated at the mask generating module 106 to the original digital image received at the digital image receiving module 104. In an exemplary embodiment, a Canny edge detector can be implemented to determine the edges of the original image creating a resulting image as best illustrated in FIG. 11.

Figure 12:
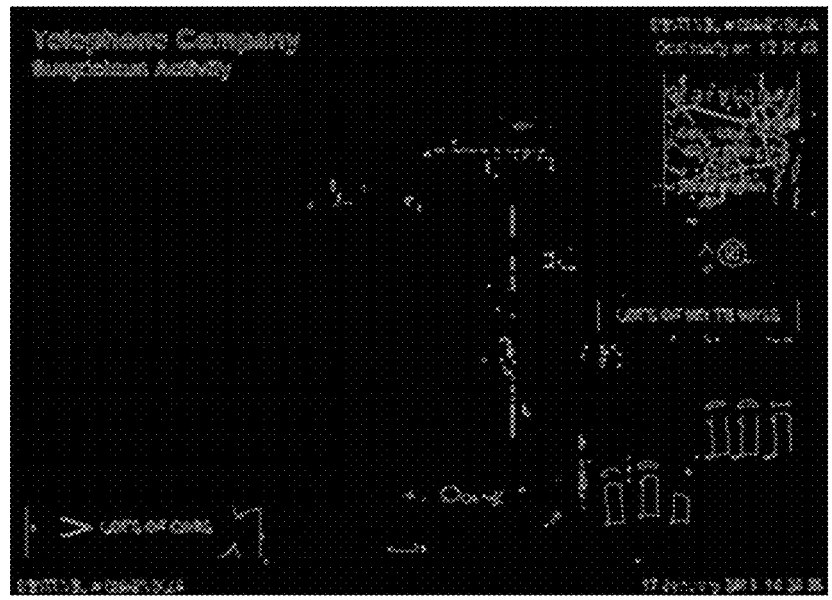
FIG. 12 shows a second filtered image generated based on the method of processing an image according to an exemplary embodiment of the present disclosure.

In an exemplary embodiment, the textual object extraction module 108 can be further configured to remove horizontal lines present in the resulting image after applying the mask to the digital image as illustrated in FIG. 12. For example, a line threshold can be set such that a predetermined number of adjacent pixels in the same row having the same pixel intensity are considered to be a horizontal line. When the line threshold is applied to the resulting image, any adjacent pixels equal to or greater than the line threshold are converted to the second pixel intensity value thereby removing the horizontal lines from the image.

Figure 13:
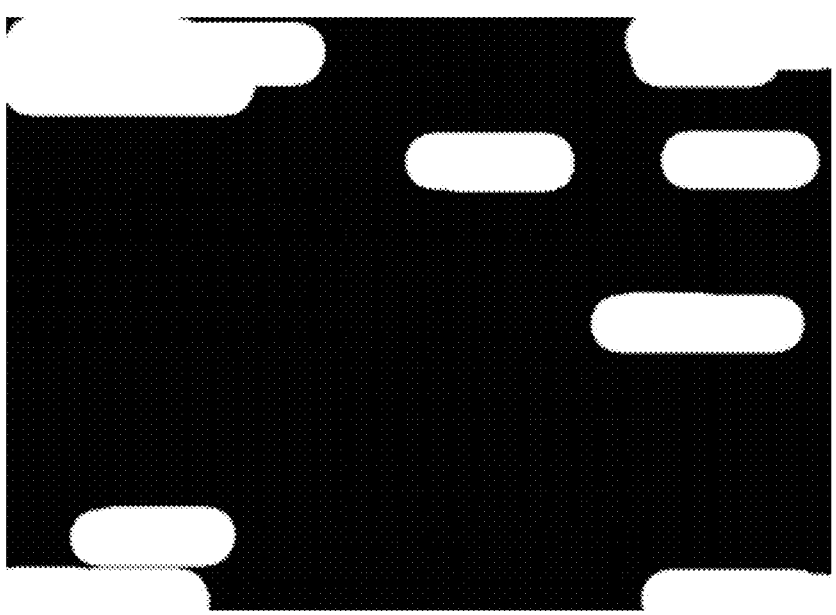
FIG. 13 shows cropping identifiers generated based on the method of processing an image according to an exemplary embodiment of the present disclosure.
Figure 14:
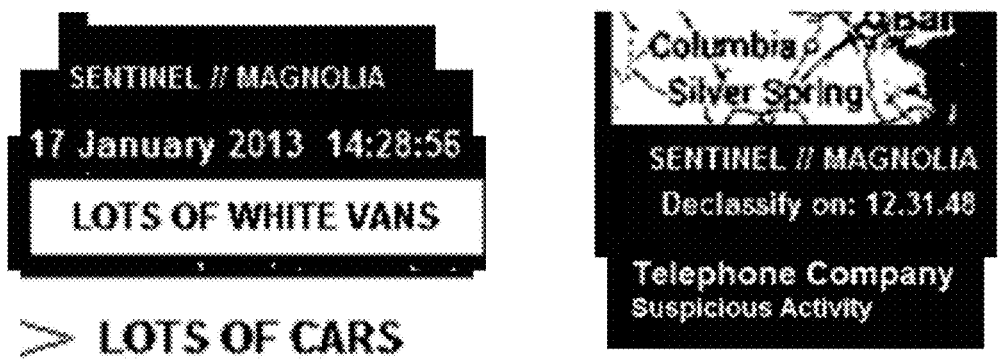
FIG. 14 shows portions of the digital image identified as including textual objects to perform character recognition based on the method of processing an image according to an exemplary embodiment of the present disclosure.

In another exemplary embodiment, cropping lines are defined to identify portions of the resulting image to crop where a character recognition technique is applied to the portions of the resulting image associated with the cropping lines. For example, the textual object extraction module 108 is further configured to identify cropping lines within the resulting image. Since textual objects are generally arranged in a straight line (e.g., a horizontal line for glyphs associated with Roman characters and a vertical line for glyphs associated with non-Roman characters), a predetermined cropping line threshold is determined. When portions of the resulting image are equal to or greater than the predetermined cropping line threshold, a cropping line is arranged over the portions of the resulting image as best illustrated in FIG. 13. The textual object extraction module 108 is then configured to crop out the textual objects associated with the portions of the resulting image in which the cropping line is arranged as best illustrated in FIG. 14. The resulting textual objects can be enhanced (e.g., increased contrast, etc.) and/or enlarged to support character recognition.

At 208, character recognition is performed. For example, the character recognition module 110 is configured to extract text from the cropped portions of the resulting image associated with the digital image. In an exemplary embodiment, an open source Tesseract OCR engine is used to extract text from each of the cropped portions and the character recognition module 110 generates a string of extracted text. In this case, when the text is extracted from the digital image illustrated in FIG. 4, using the methods described above, the following text string is generated:

SENTINEL//MAGNOLIA 17 Jan. 2013 14:28:56 LOTS OF WHITE VANS LOTS OF CARS DECLASSIFY ON: 12.31.48 TELEPHONE COMPANY SUSPICIOUS ACTIVITY

In an exemplary embodiment, the text string can be created by compiling the extracted text based on the location of the textual object in the digital image. For example, the character recognition module 110 can scan the image in a clockwise manner such that the resulting text string includes the text extracted and arranged to reflect the clockwise scan of the digital image.

Figure 15:
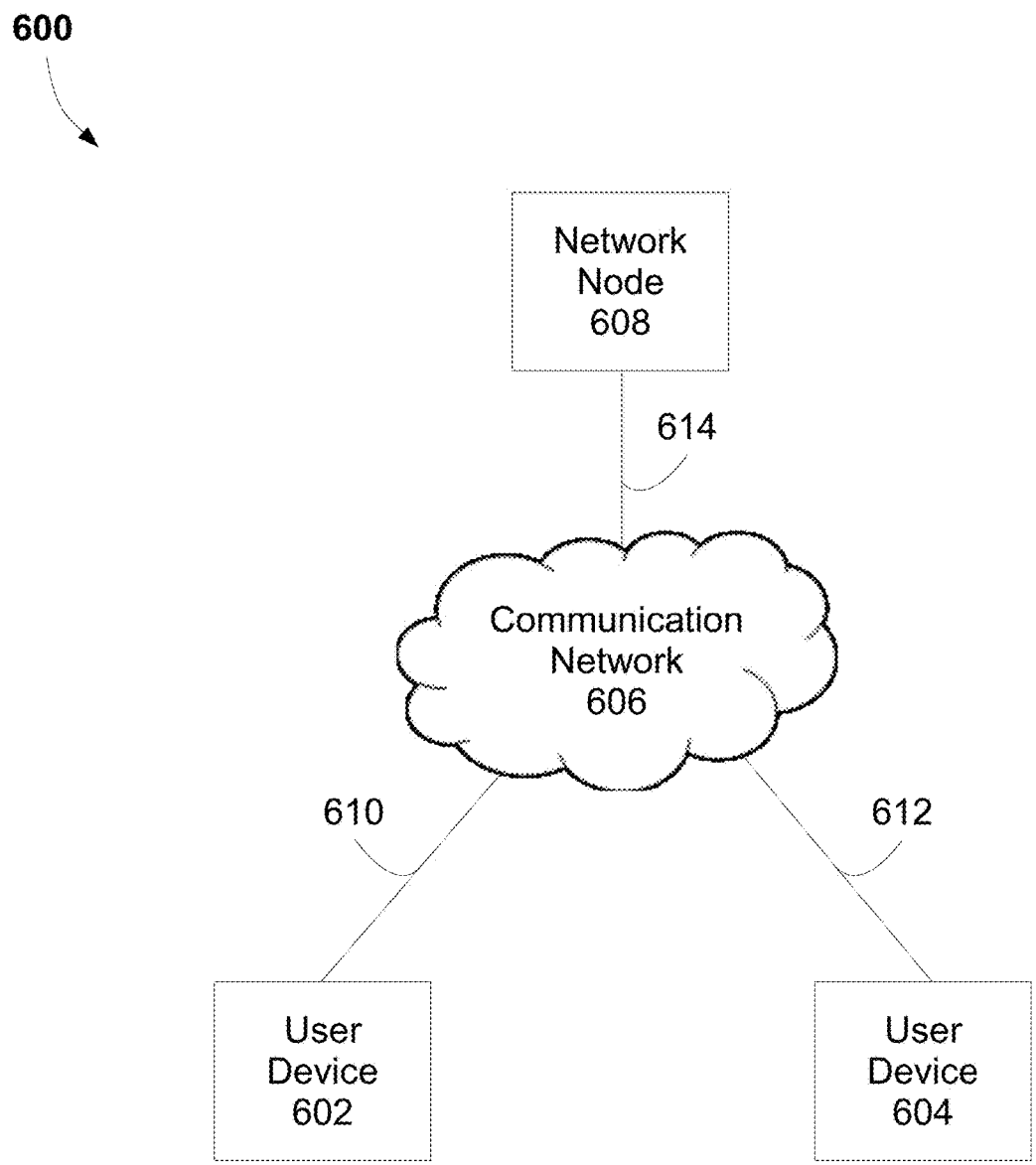
FIG. 15 is a system for image processing according to an exemplary embodiment of the present disclosure.

FIG. 15 illustrates an exemplary communication system 600 for communicating information over a communication network. Communication system 600 includes a first user device 602, a second user device 604, a communication network 606, and a network node 608. Other network elements may be present in the communication system 600 to facilitate communications but are omitted for clarity, such gateways, switching centers, processing nodes, routers, physical and/or wireless data links for carrying data among the various system elements, etc.

User devices 602, 604 are any device configured to communicate over communication system 600 using an interface. The interface can be a wired and/or wireless interface. User device 602, 604 can be a smartphone, a laptop, tablet, any other wired and/or wireless internet access device, and combinations thereof. It is noted that while two user devices 602, 604 are illustrated in FIG. 15 as being in communication with communication network 606, any number of user devices can be implemented according to various exemplary embodiments disclosed herein. Each user device 602, 604 includes one or more transceivers for transmitting and receiving data over communication system 600. Each transceiver can be wired or wireless.

User device 602 is in communication with communication network 606 over communication link 610. User device 604 is in communication with communication network 606 over communication link 612. Network node 608 is in communication with communication network 606 over communication link 614. Links 610, 612, 614 can use various communication media, such as air, space, metal, optical fiber, or some other signal propagation path—including combinations thereof. Communication links 610, 612, 614 may comprise many different signals sharing the same link. Communication links 610, 612, 614 could include multiple signals operating in a single "airpath" comprising beacon signals, user communications, communication sessions, overhead communications, frequencies, timeslots, transportation ports, logical transportation links, network sockets, packets, or communication directions.

User devices 602, 604 can be configured to communicate information over system 600 using various communication services. In an exemplary embodiment, an application programming interface (API) can be installed over system 600 (e.g., at network node 608) such that a graphical user interface (GUI) installed at the user devices 602, 604 allows each device to transmit and receive files from the network node 608. In an exemplary embodiment, the user devices 602, 604 can be configured to transmit files in various modes such as a file request mode and a batch request mode. In a file request mode, a user associated with the user device 602, 604 identifies a single file to transmit and/or receive from the network node 608. In a batch request mode, a user associated with the user device 602, 604 identifies a universal naming convention (UNC) path to share files between the user device 602, 604 and the network node 608.

User devices 602, 604 include a processor and associated circuitry to execute or direct the execution of computer-readable instructions to obtain information. Each user device 602, 604 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. User devices 602, 604 can receive instructions and other input at a user interface.

Network node 608 is any network node configured to perform image processing and to communicate information over system 600. Network node 608 can be a standalone computing device, computing system, or network component, or network node 608 can be different elements coupled together. Network node 608 can be accessible, for example by a wired or wireless connection, or through an indirect connection such as through a computer network or communication network.

Network node 608 includes a processor and associated circuitry to execute or direct the execution of computer-readable instructions to obtain information. The network node 608 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network node 608 can receive instructions and other input at a user interface.

Figure 16:
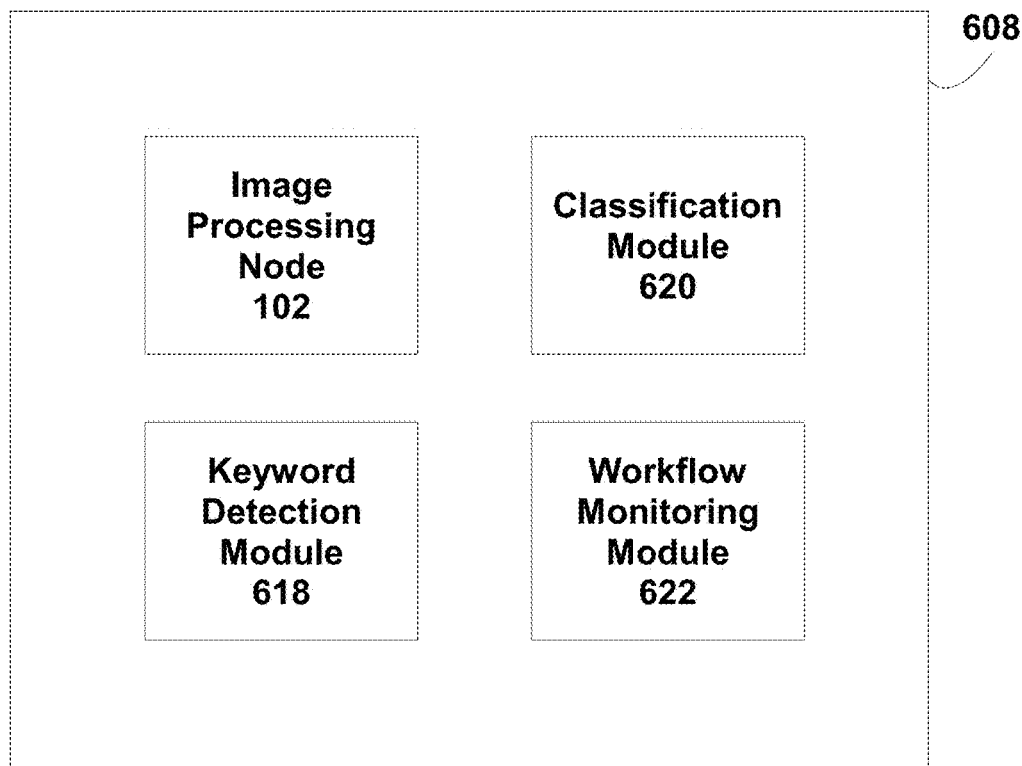
FIG. 16 is a network node in the system for image processing illustrated in FIG. 15 according to an exemplary embodiment of the present disclosure.

In an exemplary embodiment, as illustrated in FIG. 16, network node 608 includes an image processing element, such as image processing node 102, a keyword detection module 618, a classification module 620, and a workflow monitoring module 622. The imaging processing node 102 is configured as discussed above and receives a digital image from an image capturing device. The image capturing device can be local to the network node 608 or coupled to the network node over communication network 606. After the text is extracted from the digital image using the image processing node 102, the keyword detection module 618 is configured to detect keywords from the text string extracted from the digital image. The classification module 620 is configured to tag and classify the digital image based on any keywords detected from the text string. The workflow monitoring module 622 is configured to monitor the transmission of the digital image over the system 600. The workflow monitoring module 622 can be configured to automatically oversee the transmission of the digital image over the system 600 and/or a user can interact with the workflow monitoring module 622 such that the user can determine whether transmission is appropriate and approve the transmission based on various factors such as the keywords extracted from the digital image, the destination user device, the security classification, etc.

Communication network 606 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 606 is configured to carry data between user devices 602, 604 and network node 608. Communication network 606 can use wired and/or wireless protocols. Wireless network protocols can include any type of communication protocols including code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 606 include Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 606 can also comprise additional base stations, controller nodes, telephony switches, internet routers, network gateways, computer systems, communication links, or some other type of communication equipment, and combinations thereof.

In operation, a digital image is uploaded to the network node 608. The digital image can be captured at one of the user devices 602, 604 or any other image capturing node. A user associated with the first user device 602 instructs the network node 608 to transmit the digital image to the second user device 604. The network node 608 receives various requests to extract text from digital images and queues the request from the first user device 602. The network node 608 processes the various requests to extract text from digital images in a first in, first out fashion.

When text is extracted from the digital image, the network node 608 can identify and tag the digital image based on any metadata associated with the digital image or the keywords extracted from the digital image to determine the type of file associated with the digital image. For example, the network node 608 tags any keywords discovered in the digital image such as the "comment" metadata field for image files, the "subject" filed for PDFs, and the "description" field for Microsoft Office file formats. The Extensible Metadata Platform (XMP) can be leveraged to stamp multiple image formats such as JPG, PNG, TIF, GIF, PDF, and PSD where the XMP stores information as character strings.

In an exemplary embodiment, the digital image can be tagged by reading the raw bytes included in the file header of the digital image to determine the file type, regardless of the specified file extension. The network node 608 tags the metadata with any keywords identified, relative to the file format of the digital image. In a content management system (CMS), the network node 608 can stamp all digital image metadata with extracted keywords to increase content searchability, especially for digital pictures not normally searchable by text content.

In addition to the text extraction capabilities as discussed above, the network node 608 can further flag digital images that contain obfuscated textual objects, such as white-on-white text, black-on-black text, or text with illegible font sizes. If the network node 608 is instructed to perform text extraction including any obfuscated text, network node 608 traverses all of the textual elements of any document that includes rich text markup capabilities and evaluates any font color and size for each element. Any identified text obfuscation is flagged.

The network node 608 can further flag image files that exceed a specified level of image resolution. In an exemplary embodiment, the resolution of the digital image can be determined by calculating the total size of the image (length and width) in pixels. The resolution of the digital image is compared to the maximum allowed resolution to determine whether the image passes or fails a scan. For example, when a digital image has a resolution above a predetermined threshold, the network node 608 can determine that the digital image is classified such that digital images above a certain threshold resolution are not to be inadvertently transmitted to an unclassified user device 602, 604. Alternatively, when the digital image has a resolution above a predetermined threshold, the network node 608 can determine not to transmit the digital image to a user device 602, 604 because the size of the digital image would exceed acceptable download times to publish pictures to a public-facing website.

The network node 608 can be further configured to support different sets of allowed keywords for each user device 602, 604. A user associated with each user device 602, 604 can identify various acceptable and/or preferred keywords such that when the network node 608 identifies a keyword on one or more of the keyword lists, the network node 608 can automatically transmit the digital image to the user device 602, 604 associated with the keyword. In an exemplary embodiment, a keyword can be static or dynamic. For example, a static keyword is a single word or multiple words that are compared to the text extracted from the digital image. A dynamic keyword is a regular expression (regex) pattern used to identify text that may fall into various predetermined and/or known patterns such as a social security number, a credit card number, an account number, etc. If the keyword is status, the keyword detection module 618 determines whether the keyword exists within the extracted text. The keyword is then put in a temporary list that includes only keywords found in the extracted text. If the keyword is dynamic, the network node 608 performs a regex search against the extracted text and identifies all the data that matches the extracted text. Any matching strings are added to a temporary list that contains only predetermined keywords found in the extracted text. Based on the request associated with the destination user device 602, 604, the network node 608 adds the set of keywords that are allowed to exist at the user device 602, 604 (including both static keywords and dynamic regex definitions) to a separate list. This separate list is compared with the initial list of keywords, and if there are keywords present in the initial list of keywords that are not present in the separate list created after the keywords are extracted, the request is marked as failed and the digital image is not transmitted to the destination user device 602, 604.

In addition, the network node 608 can determine whether a request to transmit a digital image passes or fails a scan prior to transmission. For example, if text extracted from the digital image contains unapproved keywords, the digital image is not permitted to be transmitted to the identified user device 602, 604. If the file classification level (e.g., classified, secret, top secret, etc.) is higher than the approved classification level of the destination user device 602, 604, transmission of the digital image is prevented. If the network node 608 is prevented from sharing a digital image including a keyword over the network to any user device, transmission of the digital image is prevented. If the image resolution associated with the digital image exceeds a predetermined threshold value, transmission of the digital image is prevented. If a user associated with a user device 602, 604, and/or network node 608 indicate that a digital image including obfuscated text may not be transmitted over the network 606, transmission of the digital image is prevented.

In an exemplary embodiment, after a file is processed and an initial pass/fail assessment is performed, a user can perform a reliable human review of the digital image by performing a visual inspection of the digital image as well as any identified keywords, etc. Initially, all requests to transmit the digital image are identified as having a status of "pending." After the user reviews the digital image, the reviewer can modify the status to "approved" or "rejected". Reviewers can also further provide additional notes or comments associated with the digital image. After the digital image request is identified as approved, the network node 608 transmits the digital image to the destination user device 602, 604.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

What is claimed is:

1. A method of extracting text from a digital image, comprising: receiving a digital image at an image processor, wherein the digital image includes a textual object and a graphical object;
   defining a predetermined line threshold wherein the predetermined line threshold corresponds to a potential line of text and two end points of a line are identified;
   generating a mask based on the digital image, wherein the mask includes a pattern having a first pattern area associated with the textual object when the distance between the two points of the line are equal to or greater than the predetermined line threshold and a second pattern area associated with the graphical object when the distance between the two points of the line are less than the predetermined line threshold;
   applying the mask to the digital image creating a transformed digital image, wherein the transformed digital image includes a portion of the digital image associated with the textual object; and
   performing character recognition on the portion of the digital image associated with the textual object of the transformed digital image to create a recognized text output.

2. The method of claim 1, further comprising
   cropping the textural element from the transformed digital image before performing the character recognition; and
   enhancing the textural element from the transformed digital image before performing the character recognition.

3. The method of claim 2, wherein enhancing the textural element comprises scaling up the textural element.

4. The method of claim 1, further comprising:
   converting the digital image into a grayscale image before generating the mask, wherein the mask is applied to the grayscale image.

5. A method of extracting text from a digital image, comprising:
   receiving a digital image at an image processor, wherein the digital image includes a textual object and a graphical object;
   generating a mask based on the digital image, wherein the mask includes a pattern having a first pattern area associated with the textual object and a second pattern area associated with the graphical object;
   applying the mask to the digital image creating a transformed digital image, wherein the transformed digital image includes a portion of the digital image associated with the textual object; and
   performing character recognition on the portion of the digital image associated with the textual object of the transformed digital image to create a recognized text output,
   wherein generating the mask comprises
   generating a binary threshold image based on the digital image, wherein a first pixel intensity value is assigned to pixels of the digital image within a predetermined threshold and a second pixel intensity value different from the first pixel intensity value is assigned to pixels of the digital image outside the predetermined threshold;
   filtering the binary threshold image to determine contrast and intensity frequency values of pixels of the binary threshold image;
   isolating a portion of the binary threshold image and removing noise within the portion of the binary threshold image, wherein the portion of the binary threshold image that is isolated corresponds to the textural object of the digital image;
   dilating the binary threshold imaging using a kernel to generate a blurred image, wherein the blurred image comprises grayscale pixels;
   generating a second transformed image based on the blurred image, wherein the transformed image includes a reduced number of grayscale values within the blurred image; and
   removing noise from the second transformed image based on contours detected within the second transformed image.

6. The method of claim 5, wherein filtering the binary threshold image comprises implementing a discrete cosine transform.

7. The method of claim 5, wherein isolating the portion of the binary threshold image and removing noise within the portion of the binary threshold image comprises implementing a top-hat transform.

8. The method of claim 5, wherein generating the second transformed image comprises implementing an Otsu's method image processing technique.

9. The method of claim 1, further comprising
applying an edge detector to detect edges of the digital image after the mask is applied to the digital image to generate the transformed digital image.

10. The method of claim 1, wherein the digital image includes a plurality of textual objects and each textural object has a corresponding pattern in the mask.

11. The method of claim 10, wherein the recognized text output comprises a text string associated with each of the plurality of textural objects.

12. The method of claim 11, wherein the text string is created by identifying text in a clockwise direction within the digital image.

13. A method of extracting text from a digital image, comprising:
receiving a digital image at an image processor, wherein the digital image includes a textual object and a graphical object;
determining whether the digital image is an unsearchable scanned document or an unsearchable digital image, wherein an unsearchable scanned document has text in horizontal lines throughout the digital image, and wherein an unsearchable digital image does not have text in horizontal lines throughout the image;
if the digital image is determined to be an unsearchable digital image that does not have text in horizontal lines throughout the image, then
generating a mask based on the digital image, wherein the mask includes a pattern having a first pattern area associated with the textual object and a second pattern area associated with the graphical object;
applying the mask to the digital image creating a transformed digital image, wherein the transformed digital image includes a portion of the digital image associated with the textual object; and
performing character recognition on the portion of the digital image associated with the textual object of the transformed digital image to create a recognized text output; or
if the digital image is determined to be an unsearchable scanned document, performing character recognition on the text in horizontal lines throughout the digital image to create a recognized text output.

14. The method of claim 13, further comprising
cropping the textural element from the transformed digital image before performing the character recognition; and
enhancing the textural element from the transformed digital image before performing the character recognition.

15. The method of claim 14, wherein enhancing the textural element comprises scaling up the textural element.

16. The method of claim 13, further comprising:
converting the digital image into a grayscale image before generating the mask, wherein die mask is applied to the grayscale image.

17. A method of extracting text from a digital image, comprising:
receiving a digital image at an image processor, wherein the digital image includes a textual object and a graphical object;
determining whether the digital image is an unsearchable scanned document or an unsearchable digital image, wherein an unsearchable scanned document has text in horizontal lines throughout the digital image, and wherein an unsearchable digital image does not have text in horizontal lines throughout the image;
if the digital image is determined to be an unsearchable digital image that does not have text in horizontal lines throughout the image, then
generating a mask based on the digital image, wherein the mask includes a pattern having a first pattern area associated with the textual object and a second pattern area associated with the graphical object;
applying the mask to the digital image creating a transformed digital image, wherein the transformed digital image includes a portion of the digital image associated with the textual object; and
performing character recognition on the portion of the digital image associated with the textual object of the transformed digital image to create a recognized text output; or
if the digital image is determined to be an unsearchable scanned document, performing character recognition on the text in horizontal lines throughout the digital image to create a recognized text output,
wherein generating the mask comprises
generating a binary threshold image based on the digital image, wherein a first pixel intensity value is assigned to pixels of the digital image within a predetermined threshold and a second pixel intensity value different from the first pixel intensity value is assigned to pixels of the digital image outside the predetermined threshold;
filtering the binary threshold image to determine contrast and intensity frequency values of pixels of the binary threshold image;
isolating a portion of the binary threshold image and removing noise within the portion of the binary threshold image, wherein the portion of the binary threshold image that is isolated corresponds to the textural object of the digital image;
dilating the binary threshold imaging using a kernel to generate a blurred image, wherein the blurred image comprises grayscale pixels;
generating a second transformed image based on the blurred image, wherein the transformed image includes a reduced number of grayscale values within the blurred image; and
removing noise from the second transformed image based on contours detected within the second transformed image.

18. The method of claim 17, wherein filtering the binary threshold image comprises implementing a discrete cosine transform.

19. The method of claim 17, wherein isolating the portion of the binary threshold image and removing noise within the portion of the binary threshold image comprises implementing a top-hat transform.

20. The method of claim 17, wherein generating the second transformed image comprises implementing an Otsu's method image processing technique.

* * * * *